United States Patent [19]

Baatrup

[11] Patent Number: 4,557,338
[45] Date of Patent: Dec. 10, 1985

[54] TOOL, PARTICULARLY A BORING TOOL

[75] Inventor: Johannes V. Baatrup, Sønderborg, Denmark

[73] Assignee: Danfoss A/S, Nordborg, Denmark

[21] Appl. No.: 555,041

[22] Filed: Nov. 25, 1983

[30] Foreign Application Priority Data

Dec. 16, 1982 [DE] Fed. Rep. of Germany ....... 3246548

[51] Int. Cl.$^4$ ............................................. B23B 45/16
[52] U.S. Cl. ...................................... 173/134; 173/159
[58] Field of Search .................. 173/159, 19, 104, 105, 173/91, 114, 116, 125, 134; 81/439, 440; 403/359, 298; 464/74, 158; 418/61 B; 91/196; 92/117

[56] References Cited

U.S. PATENT DOCUMENTS

| | | | |
|---|---|---|---|
| 1,846,817 | 2/1932 | Smith, Jr. .............................. | 173/134 |
| 1,922,329 | 8/1933 | Richardson ........................... | 173/134 |
| 2,887,920 | 5/1959 | Austin ................................... | 81/429 |
| 3,055,441 | 10/1962 | Merrison .............................. | 173/134 |
| 3,953,158 | 4/1976 | Uppal .................................... | 464/158 |
| 4,145,167 | 3/1979 | Baatrup ............................... | 418/61 B |
| 4,323,335 | 4/1982 | Hansen ................................ | 418/61 B |
| 4,432,709 | 2/1984 | Hansen ................................ | 418/102 |

Primary Examiner—Donald R. Schran
Assistant Examiner—James Wolfe
Attorney, Agent, or Firm—Wayne B. Easton

[57] ABSTRACT

This invention relates to a fluid pressure operated tool of the type having an axially reciprocatable and rotatable shaft to which a work piece such as a rock drill is attachable. The tool is driven by a planetary piston type of motor with a rotary externally toothed gear member having rotational and orbital movement relative to a surrounding internally toothed gear member. The externally toothed gear member is connected to a rotatable valve member and reciprocatable and rotatable output shaft by a cardan type shaft. The output shaft has a piston part which is subject to being alternately pressurized in opposite directions to produce the reciprocating motion.

5 Claims, 2 Drawing Figures

TOOL, PARTICULARLY A BORING TOOL

The invention relates to a tool, particularly a boring tool, comprising a housing and an output shaft which, depending on actuation of a valve arrangement, is rotatable with the aid of a pressure medium-operated rotary motor having a rotor and a stator and is axially displaceable through a given stroke with the aid of a pressure medium-operated axial motor comprising a piston in a cylinder separating two actuating pressure chambers.

In a known tool of this kind (U.S. Pat. No. 2,887,920), the cylinder of the axial motor is secured to a stand. The piston rod of the associated piston carries the housing of the rotary motor which is additionally guided on the stand by way of an arm which is fixed thereto and can actuate limiting switches. The output shaft is fixed to the rotor of the rotary motor. If compressed air is fed to the two motors by way of a valve arrangement, the output shaft is simultaneously turned and axially displaced.

This tool is comparatively large. It cannot be used as a hand tool. In addition, comparatively large masses have to be reciprocated axially, which has a disadvantageous influence on the operating speed and on the size of the axial motor.

It is the problem of the invention to provide a tool of the aforementioned kind which is substantially smaller and may also be employed as a hand tool.

This problem is solved according to the invention in that the piston is fixed to the output shaft which is connected to rotate with the rotor by way of a coupling permitting axial displacement.

In this construction, only the output shaft is axially reciprocated. Comparatively small piston dimensions suffice for this purpose. In addition, all the parts can be accommodated in a common housing. The total dimensions are small. The implement is also usable as a hand tool. Comparatively high speeds can be used for the axial reciprocation. Even operation in the manner of a percussion drill is possible.

Advantageously, the output shaft comprises a bore which is open towards the rotor and has internal toothing extending at least over the length of the stroke and engaged by external toothing provided at least at the end of a coupling shaft fixed to rotate with the rotor. In this way one obtains a coupling which can transmit comparatively large torques despite the possibility of axial displacement.

In a preferred embodiment, the rotor is a gear which turns and planetates relatively to a gear ring and forms therewith compression chambers which are functionally correctly connectible by way of a distributing valve to supply and discharge connections, the coupling shaft being a cardan shaft which compensates the planetating motion of the gear. In this construction, one can to a large extent revert to the known construction of a rotary motor.

It is advisable for the distributing valve to be formed by control orifices in a bore fixed with respect to the housing and in a cylindrical rotary slide co-operating therewith, and for the rotary slide to be a sleeve which is axially fixed but connected to rotate with the output shaft and the internal circumference of which defines the cylinder for the piston. Since the rotary slide is in any case rotatably mounted in the fixed bore, the piston can be axially displaced relatively to the cylinder formed by the rotary slide sleeve so that only the usual stresses in the axial direction or in the circumferential direction but not combined stresses occur at the two bearing faces.

Preferably, at least one entrainment member is fixed to the rotary slide sleeve to engage in an axial groove of the piston extending at least over the length of the stroke. A single entrainment member is usually sufficient because the torque for entraining the rotary slide sleeve is comparatively small.

It is also favourable for the one actuating pressure chamber to be connectible through a central hole of the rotor to a connection at the remote housing portion. This simplifies the disposition of the passages considerably. At the remote housing portion there is sufficient space for accommodating such a connection. In particular, the output shaft can be brought close to the rotary motor in its retracted axial position. All this contributes to achieving a small tool.

The other actuating pressure chamber can be connected to a connection at the adjacent housing circumference. This provides a very short connecting distance. At this position there is also sufficient space for such a connection.

In a preferred example, the housing comprises a end wall having connections at the side, the stator arranged between two side plates, a sleeve extending over the region of the distributing valve, as well as a front attachment which sealingly guides the output shaft at the free end, bounds an annular actuating pressure chamber, carries the associated connection at the circumference, and secures the axial position of the rotary slide with an inner end face. By reason of the fact that the front attachment has a plurality of functions allocated to it, a particularly simple construction is achieved.

In a further development of the invention, the valve arrangement may comprise a change-over valve which has a part connected to the housing and a rotary part driven by the output shaft and which connects the two actuating pressure chambers at alternate sides alternately to a pressure source and a container. Since this change-over valve is actuated at least once during each revolution of the output shaft, one obtains a percussion drill effect. It is particularly advisable to drive the rotary motor as well as the axial motor with pressure fluid from the same pressure source. The pressure fluid permits comparatively large forces and torques to be applied. If leakage paths are formed in the housing between the system of the rotary motor and the system of the operating motor, this is harmless because the fluid returns to a common installation.

Preferred examples of the invention will now be described in more detail with reference to the drawing, wherein.

Figures 1, 2:
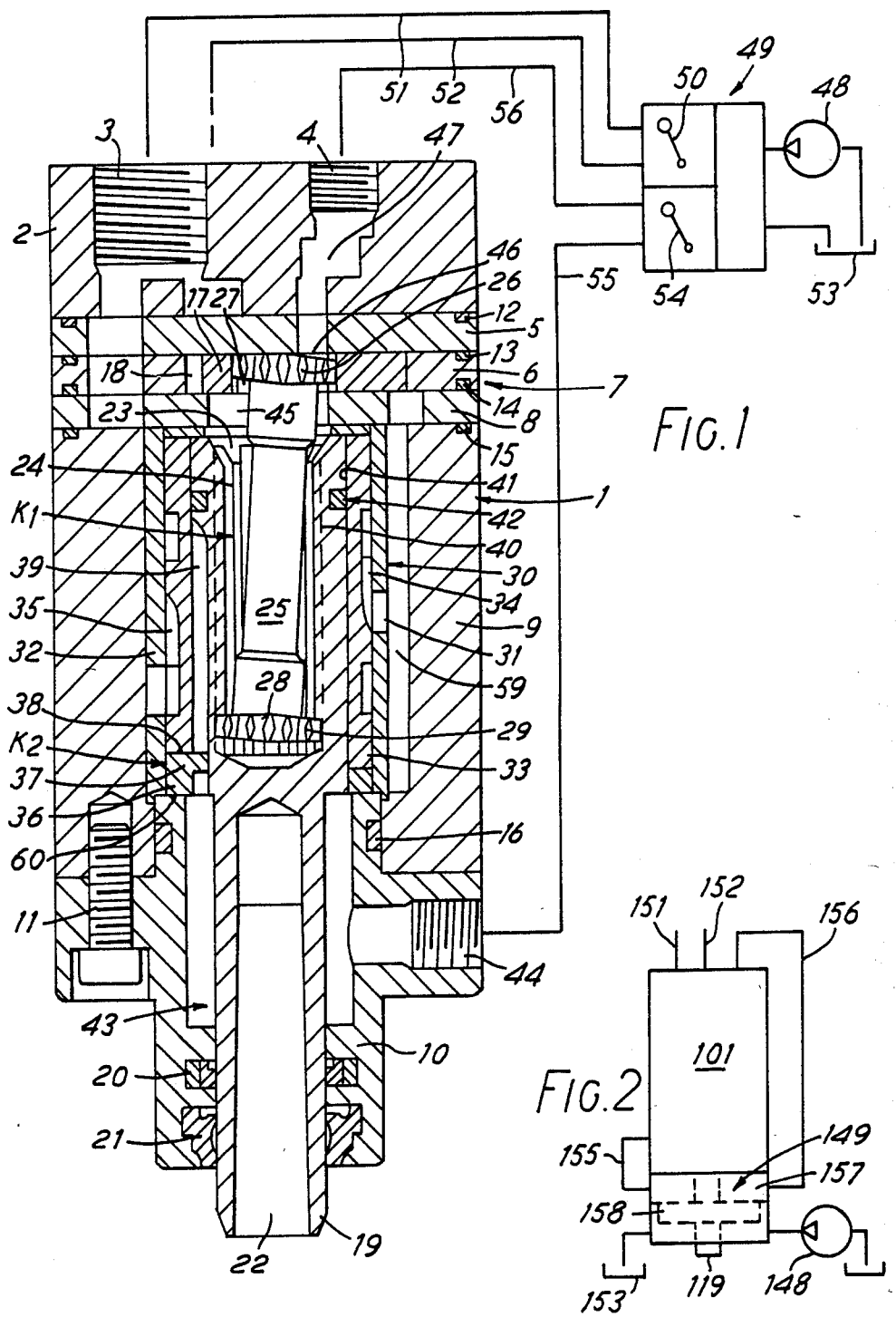
FIG. 1 is a longitudinal section through a tool according to the invention.
FIG. 2 is a diagrammatic representation of a modified embodiment.

A housing 1 comprises an end plate 2 with connections at the side, of which the connections 3 and 4 are visible, a side plate 5, a stator 6 of a rotary motor 7, a further side plate 8, a sleeve 9 and a front attachment 10, which are interconnected by screws of which only the screw 11 is illustrated. Between these housing parts there are sealing rings 12, 13, 14, 15 and 16.

The stator 6 has the shape of an internally toothed gear ring which forms compression chambers 18 together with an externally toothed gear 17. An output shaft 19 is mounted in the front attachment 10 of the housing and sealed from the outside by means of a first seal 20 and a second stripper seal 21. The output shaft comprises a front bore 22 for receiving a tool and a rear bore 23 which is provided with internal toothing 24. The teeth of this toothing extend over the entire length of the bore 23. A cardan shaft 25 has an externally toothed head 26 engaging in an internally toothed bore 27 of rotor 17 which turns a planetates relatively to the stator 6. The other end of the cardan shaft 25 has a head 28 with external teeth 29 engaging in the internal teeth 24 of bore 23. In this way, the rotor 17 is fixed to rotate with the output shaft 19.

A distributing valve 30 comprises control orifices 31 in a cylindrical insert 32 of the housing. These control orifices communicate with the compression chambers 18 by way of a passage 59. Also part of the distributing valve 30 there is a rotary slide sleeve 33 with control orifices 34 and 35 connected by unreferenced passages to the connections for the supply and discharge. The rotary slide sleeve 33 is provided at one end with an entrainment ring 36 equipped with an entrainment member 37. The latter engages on the one side in a radial groove 38 of the rotary slide sleeve 33 and on the other side in an axial groove 39 of an enlarged portion of the output shaft 19. The rotary slide sleeve is therefore fixed to rotate with the output shaft 19 and therefore connected to the rotor 17. The rotary slide sleeve 33 is secured against axial displacement by the end face 60 of the front attachment 10.

The enlarged portion of the output shaft 19 forms a piston 40 which is axially displaceable in a cylinder formed by the inner circumference 41 of the rotary slide sleeve 33 whilst being sealed by a sealing ring 42. During displacement, the piston 40 moves in an actuating pressure chamber 43 in the form of an annular chamber which is bounded by the front attachment 10 is connected to a connection 44 at the adjacent housing circumference. The other actuating pressure chamber 45 communicates with the connection 4 by way of a central hole 46 in the rotor 17 and a further housing passage 47. The internal toothing 24 and external toothing 29 form a first coupling $K_1$. The entrainment member 37 and axial groove 39 form a second coupling $K_2$. These two couplings permit rotary entrainment and also axial displacement over the entire stroke of the piston 40 and thus of the output shaft 19.

The tool is fed by a pump 48 by way of a valve arrangement 49. The latter comprises a first setting apparatus 50 with which the supply and discharge connections of the rotary motor 7 are connectible by way of conduits 51 and 52 to the pump or the container 53. A second setting apparatus 54 actuates a change-over valve which connects the actuating pressure chambers 43 or 45 by way of the conduits 55 and 56 to the pump 48 or to the container 53 or separates them from both.

Further details of the construction of the rotary motor 7 can be taken from DE-OS No. 29 10 831.

If the rotary motor 7 is set in operation, the output shaft 19 turns in conventional manner. If the actuating pressure chamber 45 is simultaneously subjected to pressure, the output shaft 19 moves downwardly. If the pressure is switched over to the actuating pressure chamber 43, the output shaft 19 moves upwardly whilst maintaining its rotary motion. The illustration shows that the tool can be small and compact and therefore also used as a hand tool.

In the FIG. 2 embodiment, corresponding parts carry the same reference numerals increased by 100. In this case, a modified valve arrangement 149 is provided for the actuating pressure chambers. A change-over valve comprises a first valve member 157 which is fixed to the housing 101 and a second valve member 158 which is fixed to turn with the output shaft 119. During each revolution of the output shaft, the change-over valve executes one operating cycle in which first one actuating pressure chamber and then the other actuating pressure chamber is fed with pressure fluid. This gives a percussion drill effect.

I claim:

1. A boring tool, comprising, a housing, fluid pressure operated motor means connected to said housing having an internally toothed ring gear fixed relative to said housing and an externally toothed star gear having rotational and planetary movement relative to said ring gear, rotatable valving means in said housing, output shaft means having a splined bore and axially oppositely effective piston pressure area means to effect pressure biasing of said shaft means in axially opposite directions, one of said pressure area means being internally of said splined bore, said output shaft means being connected to said valving means for rotation therewith and axial movement relative thereto, carden shaft coupling means which accomodates said planetary movement of said star gear mounted between said star gear and said output shaft means splined bore, first fluid connection means and passage means in said housing for supplying and exhausting operating fluid to and from said valving means to effect rotational movement of said motor means and said output shaft means, first and second chamber means in said housing on opposite sides of said piston pressure faces, second fluid connection and passage means in said housing for supplying and exhausting fluid to and from said chambers to effect reciprocal axial movements of said output shaft means, said spline means having a length at least equal to the stroke of said axial movement.

2. A boring tool according to claim 1 wherein said valving means includes sleeve means fixed in said housing and an inner sleeve member rotatable relative thereto, connected to said output shaft means.

3. A boring tool according to claim 2 wherein said output shaft means has axial groove means, an entrainment member fixed to said valve inner sleeve member and having means nested in said axial groove means to allow relative axial movement therebetween.

4. A boring tool according to claim 1 wherein said second fluid connection and passage means include a first inlet/outlet connection in said housing at the opposite end thereof from said output shaft means, said star gear having a central opening providing fluid communication between said first chamber means and said first inlet/outlet connection.

5. A boring tool according to claim 4 wherein said second fluid connection and passage means includes a second inlet/outlet connection in said housing between the ends thereof, said second chamber means having direct fluid communication with said second inlet/outlet connection.

* * * * *